United States Patent [19]
Eryurek

[11] Patent Number: 5,700,090
[45] Date of Patent: Dec. 23, 1997

[54] TEMPERATURE SENSOR TRANSMITTER WITH SENSOR SHEATH LEAD

[75] Inventor: Evren Eryurek, Eden Prairie, Minn.

[73] Assignee: Rosemount Inc., Eden Prairie, Minn.

[21] Appl. No.: 582,515

[22] Filed: Jan. 3, 1996

[51] Int. Cl.$^6$ ............................................. G01K 1/08
[52] U.S. Cl. .................................................... 374/210
[58] Field of Search ............................ 340/584, 588, 340/643; 364/551.01; 374/163, 166, 175, 183, 184, 185, 210; 395/906

[56] References Cited

U.S. PATENT DOCUMENTS

| | | | |
|---|---|---|---|
| 4,337,516 | 6/1982 | Murphy et al. | 364/551 |
| 4,517,468 | 5/1985 | Kemper et al. | 290/52 |
| 4,635,214 | 1/1987 | Kasai et al. | 364/551 |
| 4,707,796 | 11/1987 | Calabro et al. | 364/552 |
| 4,831,564 | 5/1989 | Suga | 364/551.01 |
| 5,122,976 | 6/1992 | Bellows et al. | 364/550 |
| 5,148,378 | 9/1992 | Shibayama et al. | 364/571.07 |
| 5,197,328 | 3/1993 | Fitzgerald | 73/168 |
| 5,214,582 | 5/1993 | Gray | 364/424.03 |
| 5,228,780 | 7/1993 | Shepard et al. | 374/175 |
| 5,235,527 | 8/1993 | Ogawa et al. | 364/571.05 |
| 5,317,520 | 5/1994 | Castle | 364/482 |
| 5,333,240 | 7/1994 | Matsumoto et al. | 395/23 |
| 5,384,699 | 1/1995 | Levy et al. | 364/413.13 |
| 5,394,341 | 2/1995 | Kepner | 364/551.01 |
| 5,414,645 | 5/1995 | Hirano | 364/551.01 |
| 5,419,197 | 5/1995 | Ogi et al. | 73/659 |

FOREIGN PATENT DOCUMENTS

64-1914  1/1989  Japan .

OTHER PUBLICATIONS

*User Instructions I$^P$AQ–H Intelligent 2–wire inhead Transmitter*, INOR The Transmitter Company, Product Group E, Nr 86 IPQ 00004 95 05 16.

Boland, Mark, "Smart Field Devices Provide New Process Data, Increase System Flexibility," *I&CS*, Nov. 1994, pp. 45–51.

"A Decade of Progress in High Temperature Johnson Noise Thermometry," *American Institute of Physics*, by T.V. Blalock and R.L. Shepard, 1982 pp. 1219–1223.

"An Integrated Architecture For Signal Validation in Power Plants," *Third IEEE International Symposium on Intelligent Control*, Aug. 24–26, 1988, pp. 1–6.

"Application of Neural Computing Paradigms for Signal Validation," *Department of Nuclear Engineering*, by B.R. Upadhyaya, E. Eryurek and G. Mathai, pp. 1–18.

"Model 3044C Smart Temperature Transmitters," *Product Data Sheet PDS 4659*, Oct. 1993, pp. 2–15.

Brochure entitled "Measurement Control Analytical Valves," Rosemount Inc. 1989.

(List continued on next page.)

*Primary Examiner*—Richard Chilcot
*Assistant Examiner*—William L. Oen
*Attorney, Agent, or Firm*—Westman, Champlin & Kelly, P.A.

[57] ABSTRACT

A temperature transmitter in a process control loop comprises a temperature sensor and a transmitter circuit. The temperature sensor includes a sensor sheath and a sensor element positioned within the sensor sheath. At least one element lead is coupled to the sensor element and extends from the sensor sheath. A sheath lead is coupled to the sensor sheath and extends from the sensor sheath, wherein the element lead and the sheath lead provide signals to be measured. The transmitter circuit includes and A/D converter, a microprocessor and an input-output circuit. The A/D converter is coupled to receive the signals from the element lead and the sheath lead. The microprocessor is coupled to the A/D converter. The input-output circuit is coupled to the microprocessor for communication with the process control loop. The sheath lead allows the transmitter to monitor the sensor sheath's insulation resistance and generation of parasitic sheath-to-lead voltage.

20 Claims, 4 Drawing Sheets

OTHER PUBLICATIONS

"Application of Johnson Noise Thermometry to Space Nuclear Reactors," *Presented at the 6th Symposium on Space Nuclear Power Systems*, by M.J. Roberts, T.V. Blalock and R.L. Shepard, Jan. 9–12, 1989.

"Automated Generation of Nonlinear System Characterization for Sensor Failure Detection," *ISA*, by B.R. Upadhyaya et al., 1989 pp. 269–274.

"Development of a Long–Life, High–Reliability Remotely Operated Johnson Noise Thermometer," *ISA*, by R.L. Shepard et al., 1991, pp. 77–84.

"Development and Application of Neural Network Algorithms For Process Diagnostics," *Proceedings of the 29th Conference on Decision and Control*, by B.R. Upadhyaya et al., 1990, pp. 3277–3282.

"Fuzzy Logic and Artificial Neural Networks for Nuclear Power Plant Applications," *Proceedings of the American Power Conference*, R.C. Berkan et al.

"Software–Based Fault–Tolerant Control Design for Improved Power Plant Operation," *IEEE/IFAC Joint Symposium on Computer–Aided Control System Design*, Mar. 7–9, 1994 pp. 585–590.

"In Situ Calibration of Nuclear Plant Platinum Resistance Thermometers Using Johnson Noise Methods," *EPRI*, Jun. 1983.

"Integration of Multiple Signal Validation Modules for Sensor Monitoring," *Department of Nuclear Engineering*, by B. Upadhyaya et al. Jul. 8, 1990 pp. 1–6.

"Johnson Noise Power Thermometer and its Application in Process Temperature Measurement," *American Institute of Physics* by T.V. Blalock et al., 1982, pp. 1249–1259.

"Johnson Noise Thermometer for High Radiation and High–Temperature Environments," *Fifth Symposium*, by L. Oakes et al., Jan. 1988, pp. 2–23.

"Neural Networks for Sensor Validation and Plant Monitoring," *International Fast Reactor Safety Meeting*, by B. Upadhyaya, Aug. 12–16, 1990, pp. 2–10.

"Neural Networks for Sensor Validation and Plantwide Monitoring," by E. Eryurek.

"Noise Thermometry for Industrial and Metrological Application at KFA Julich," *7th International Symposium on Temperature*, by H. Brixy et al. 1992.

"Application of Neural Networks for Sensor Validation and Plant Monitoring," *Nuclear Technology*, by B. Upadhyaya, vol. 97, No. 2, Feb. 1992 pp. 170–176.

"Parallel, Fault–Tolerant Control and Diagnostics System for Feedwater Regulation in PWRS," *Proceedings of the American Power Conference*, by E. Eryurek et al.

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Survey, Applications, And Prospects of Johnson Noise Thermometry," *Electrical Engineering Department*, by T. Blalock et al. 1981 pp. 2–11.

"Tuned–Circuit Dual–Mode Johnson Noise Thermometers," by R.L. Shepard, 1992.

"Tuned–Circuit Johnson Noise Thermometry," *7th Symposium on Space Nuclear Power Systems*, by Michael Roberts et al., Jan. 1990.

"Using Artificial Neural Networks to Identify Nuclear Power Plant States," by Israel E. Alguindigue et al., pp. 1–4.

TEMPERATURE SENSOR TRANSMITTER WITH SENSOR SHEATH LEAD

BACKGROUND OF THE INVENTION

The present invention relates to transmitters used in process control loops. More specifically, the present invention relates to a temperature transmitter having a sensor with a sensor sheath lead.

Process control transmitters are used to measure process parameters in process control systems. Microprocessor-based transmitters include a sensor, an analog-to-digital converter for converting an output of the sensor into a digital form, a microprocessor for compensating the digitized output and an output circuit for transmitting the compensated output to instrumentation and control equipment. Typically, this transmission is over a process control loop, such as a 4–20 mA current loop.

One example of a process parameter is temperature. Temperature is sensed by measuring the resistance of a Resistive Temperature Device ("RTD"), such as a Platinum Resistance Thermometer ("PRT"), or by measuring a voltage output of a thermocouple sensor. For example, the resistance of an RTD can be measured by connecting the RTD in series with a known reference resistance ($R_{REF}$) and applying a current common to both resistances. The voltages across each resistance are measured and digitized by the A/D converter. The microprocessor receives the digitized values, calculates the resistance of the RTD based on the digitized values and compensates the calculated resistance for various parasitic effects in the sensor and the transmitter. The resulting resistance value is converted into a corresponding sensor temperature value with a look-up table or a suitable equation by the microprocessor. The output circuit in the transmitter receives the sensor temperature value and provides the value to the process control loop as an analog current level or as a digital value superimposed on the analog circuit according to a known digital communication protocol.

A typical RTD is mounted within a distal end of a sensor sheath, which is typically a long, small diameter metal tube. A metal thermowell surrounds the sensor sheath. The RTD is electrically coupled to the transmitter's electronics through a plurality of element leads which extend from the sensor sheath. A typical RTD includes two, three or four element leads. One problem associated with RTD and other sensors is that the sensor sheath should remain electrically isolated from the sensor element and the element leads. The insulation resistance between the sensor sheath and the element leads may change over time or become shorted resulting in degraded or failed performance.

Another problem associated with temperature sensors is a parasitic sheath-to-lead voltage. A sheath-to-lead voltage is sometimes generated between the sensor sheath and the sensor element because of dissimilar metals being separated by an electrolyte made up of ceramic impurities (ionics) in the sensor and water entering into the system. This voltage may corrupt sensor measurements and result in sensor failure.

A temperature sensor and transmitter are needed which improve or substantially eliminate measurement errors from parasitic sheath-to-lead voltages and variations in insulation resistance.

SUMMARY OF THE INVENTION

The temperature sensor and associated transmitter of the present invention provide a measurement of sheath-to-lead voltage and insulation resistance which can be used to evaluate present sensor performance or predict future performance. The temperature sensor includes a sensor sheath and a sensor element positioned within the sensor sheath. The sensor element is coupled to an element lead which extends outwardly from the sensor sheath. A sheath lead is coupled to the sensor sheath and extends outwardly from the sheath with the element lead.

DETAILED DESCRIPTION OF THE PREFERRED EMBODIMENTS

The temperature transmitter of the present invention includes a sensor with an additional lead extending from the sensor sheath for measuring an insulation resistance between the sensor sheath and at least one of the element leads, and for measuring a parasitic voltage generated between the sensor sheath and one of the element leads. With the additional lead, the temperature transmitter can periodically measure the insulation resistance and the parasitic voltage to verify the proper operation of the sensor. The measurements can be made in real time with an analog measurement circuit or can be converted into digital signals for analysis by a digital processing circuit. The transmitter monitors the measurements and issues an alert or alarm if the measurements reach predetermined levels. The measurements can be monitored over time for determining a residual life estimation of the sensor and for identifying errors that may be occurring or developing. The insulation resistance and sheath-to-lead voltage measurements can also be used as compensation variables to reduce or eliminate temperature measurement errors caused by changes in insulation resistance or parasitic sheath-to-lead voltage.

Figure 1:
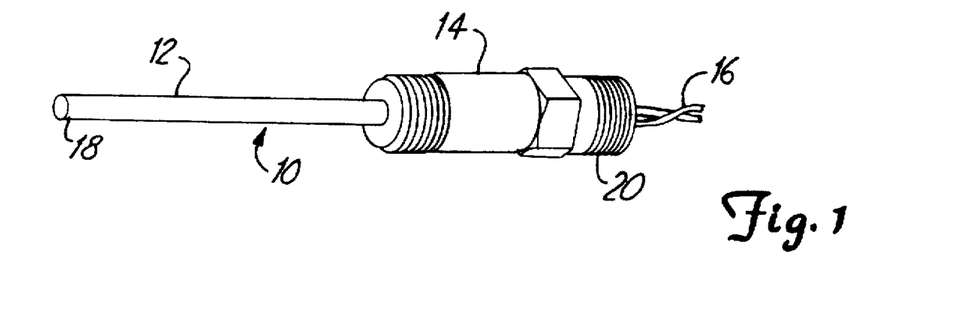
FIG. 1 is a perspective view of a temperature sensor in accordance with the present invention.

FIG. 1 is a perspective view of a temperature sensor in accordance with the present invention. Temperature sensor 10 comprises a sensor sheath 12, a mounting bolt 14 and a plurality of electrical leads 16. Sheath 12 houses a temperature sensor element (not shown in FIG. 1) which is typically mounted near a distal end 18. Sensor 10 is mounted such that distal end 18 is in thermal communication with a process to be controlled. In one embodiment, temperature sensor 10 includes threads 20 for attachment to a temperature transmitter which receives temperature measurements over leads 16 and communicates those measurements over a process control loop.

In the embodiment shown in FIG. 1, temperature sensor 10 includes a four-wire resistive temperature device (RTD) mounted within sheath 12. Leads 16 include four element leads coupled to the RTD for making resistance measurements and a fifth lead coupled to sheath 12 for making insulation resistance and parasitic voltage measurements in accordance with the present invention.

Figure 2:
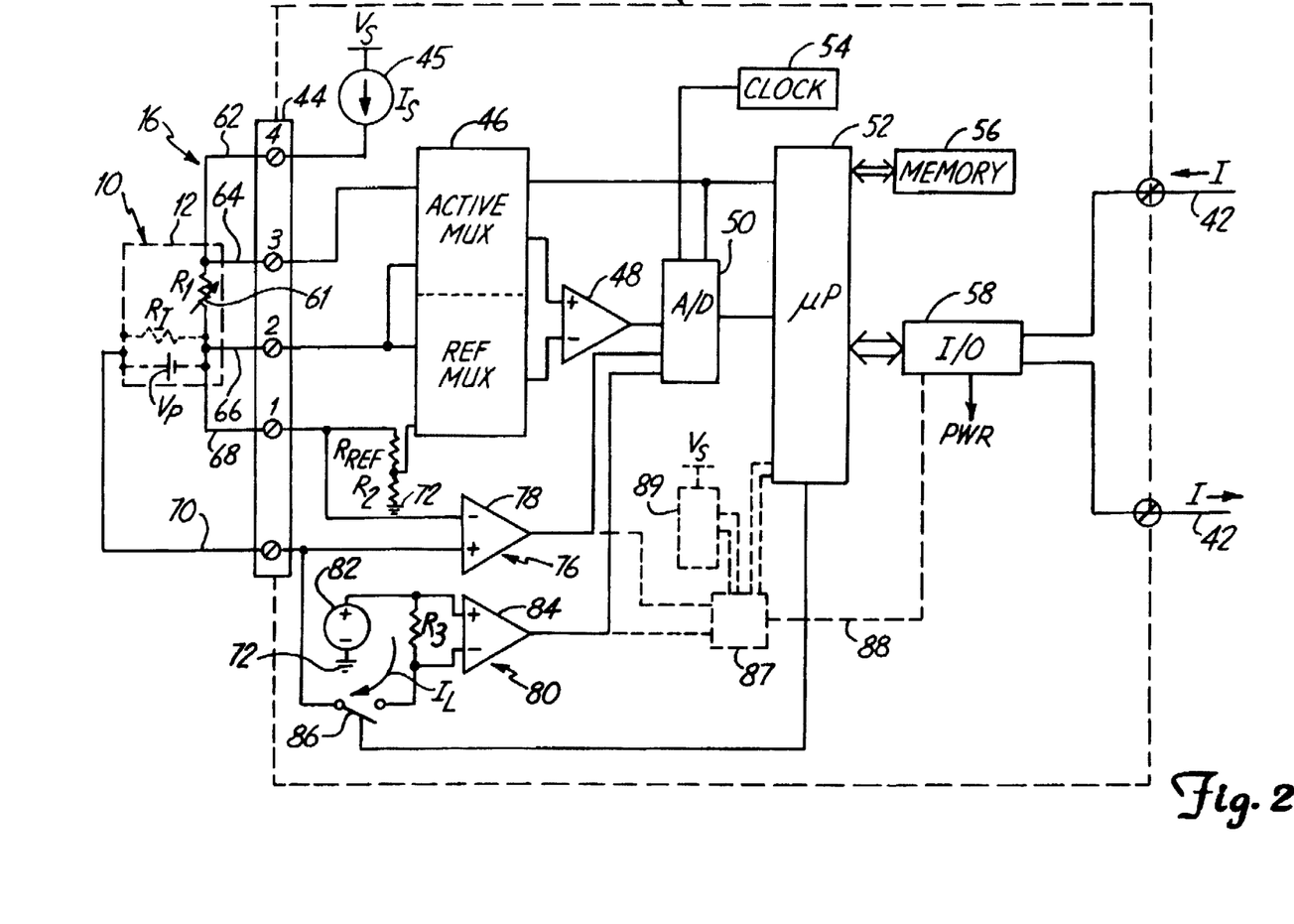
FIG. 2 is a block diagram of a temperature transmitter connected to measure temperature with an RTD sensor in accordance with one embodiment of the present invention.

FIG. 2 is a block diagram of a temperature transmitter 40 connected to RTD temperature sensor 10 in accordance with the present invention. Transmitter 40 includes terminal block 44, current source 45, multiplexer 46 differential amplifier 48, high accuracy A/D converter 50, microprocessor 52, clock circuit 54, memory 56 and input-output circuit 58.

Figure 5:
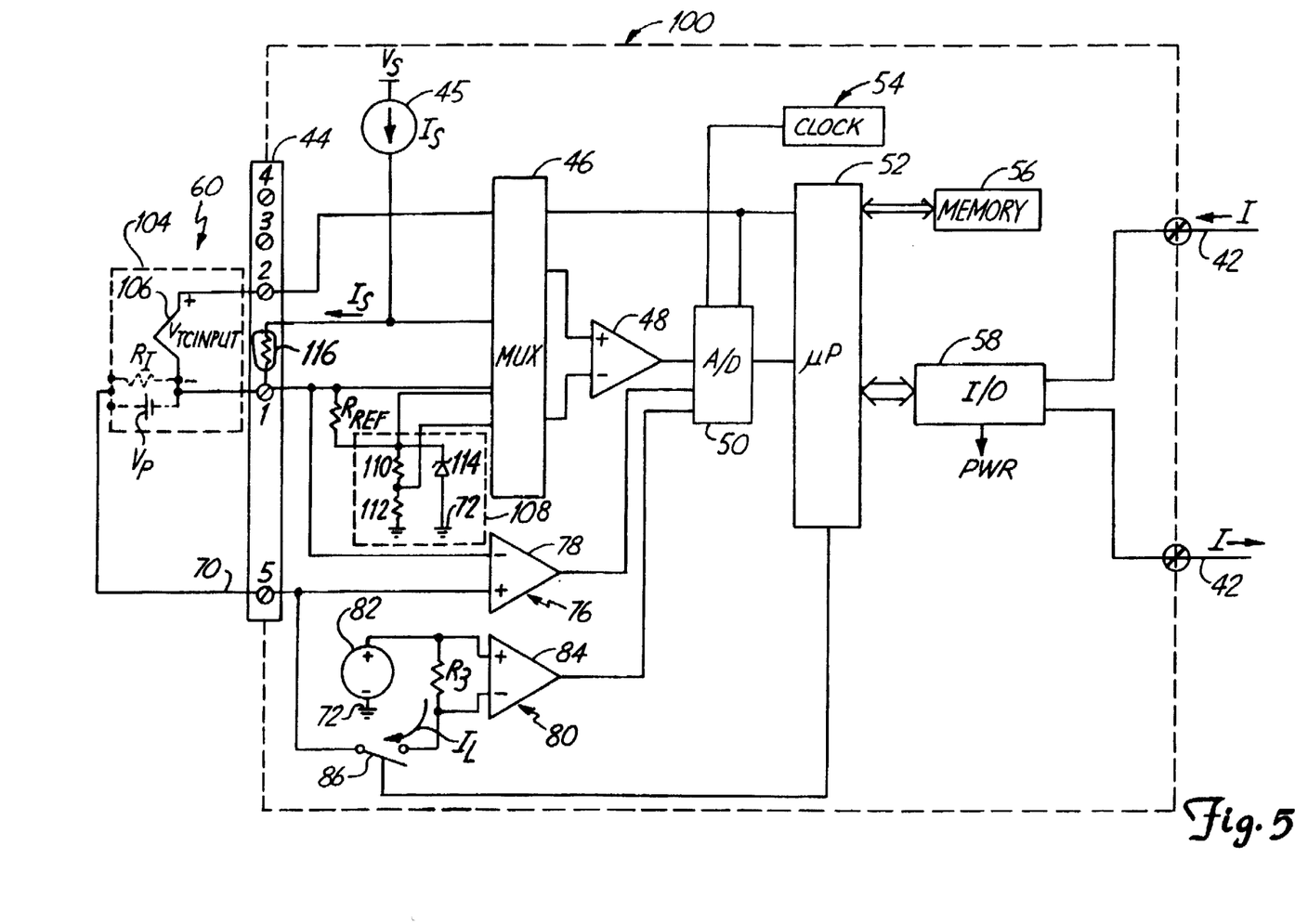
FIG. 5 is a block diagram of a temperature transmitter connected to measure temperature with a thermocouple sensor according to another embodiment of the present invention.

Terminal block 44 includes terminals 1 through 5 for coupling to, for example, RTD temperature sensor 10 or a thermocouple temperature sensor 60 (shown in FIG. 5). Sensor 10 (and sensor 60) can be either internal or external to transmitter 40. Sensor 10 includes RTD sensor element 61 having a resistance $R_1$ which varies with changes in the ambient temperature immediately surrounding sheath 12. Leads 16 include four element leads 62, 64, 66 and 68, and a sheath lead 70. Lead 62 is connected between sensor element 61 and terminal 4, lead 64 is connected between sensor element 61 and terminal 3, lead 66 is connected between sensor element 61 and terminal 2, and lead 68 is connected between sensor element 61 and terminal 1. Sheath lead 70 is connected between sensor sheath 12 and terminal 5.

Current source 45 is connected to terminal block 44 and supplies a measurement current $I_S$ through terminal 4, sensor element 61, terminal 1, reference resistance $R_{REF}$, pull-down resistance $R_2$ and ground terminal 72. Sensor element 61 develops a voltage drop across terminals 2 and 3 which is a function of the resistance $R_1$ and thus the temperature of sensor element 61. Reference resistor $R_{REF}$ is connected between terminal 1 and pull-down resistor $R_2$.

Multiplexer 46 is divided into two sections, an active multiplexer having an output connected to the non-inverting input of differential amplifier 48 and a reference multiplexer having an output connected to the inverting input of differential amplifier 48. Microprocessor 52 controls multiplexer 46 to multiplex appropriate sets of analog signals, including signals from terminals 1 through 3, to the non-inverting and inverting inputs of differential amplifier 48. Differential amplifier 48 has an output connected to A/D converter 50. In one embodiment, A/D converter 50 has an accuracy of 17 bits and a conversion rate of 14 samples/second. A/D converter 50 converts the voltage at the output of differential amplifier 48 into a digital value and provides that value to microprocessor 52 for analysis or for communication over process control loop 42 through input-output circuit 58.

Input-output circuit 58, in a preferred embodiment, includes a HART® communication section, a FIELDBUS communication section and a 4–20 mA analog loop section for analog or bidirectional digital communicating over loop 42 according to a selected protocol in a known manner. Other protocols can also be used. Loop 42 also provides power to the various components of transmitter 40 through input-output circuit 58. Transmitter 40 is wholly powered by the two-wire loop 42.

Memory 56 stores instructions and information for microprocessor 52, which operates at a speed determined by clock circuit 60. Clock circuit 60 includes a real time clock and a precision high speed clock, which are also used to sequence the operation of A/D converter 50. Microprocessor 52 performs several functions, including control of multiplexer 46 and A/D converter 50, control of communication over loop 42, temperature calculations, drift correction, circuitry diagnostics, storage of transmitter configuration parameters and performing sensor diagnostics.

Microprocessor 52 employs the following equation to compute the major value of the temperature of RTD sensor element 61:

$$R_1 = \frac{V_{R1}}{V_{RREF}} (R_{REFNOM}) \qquad \text{Equation 1}$$

where:

$R_1$=resistance of RTD sensor element 61;

$V_{R1}$=voltage drop across the RTD sensor element 61;

$V_{RREF}$=voltage drop across resistance $R_{REF}$; and $R_{REFNOM}$=nominal resistance of the reference resistance $R_{REF}$ in Ohms, and/or stored in memory 56.

Microprocessor 52 measures the voltage drop $V_{R1}$ across RTD sensor element 61 between terminals 2 and 3, and the voltage drop ($V_{RREF}$) across reference resistance $R_{REF}$ with multiplexer 46. In a four-wire resistance measurement such as the one shown in FIG. 2, the voltage drop across the connections to terminals 2 and 3 is largely eliminated, since substantially all of the current $I_S$ flows between terminals 1 and 4, and has little impact on the accuracy of the measurement. Microprocessor 52 converts the measured resistance $R_1$ into temperature units with a look-up table or suitable equations stored in memory 30.

Transmitter 40 further includes a sheath-to-lead voltage measurement circuit 76 and an insulation resistance measurement circuit 80. Within temperature sensor 10, a sheath-to-lead voltage is sometimes generated between sensor sheath 12 and sensor element 61 because of dissimilar metals in the sensor being separated by an electrolyte made up of ceramic impurities (ionics) in the sensor and water entering into the system. The sheath-to-lead voltage is shown in phantom in FIG. 2 as a voltage source $V_P$. Transmitter 40 measures voltage $V_P$ through sheath-to-lead voltage measurement circuit 76.

Circuit 76 includes an amplifier 78 with an inverting input coupled to terminal 1, a non-inverting input coupled to terminal 5 and an output coupled to A/D converter 50. Amplifier 78 is therefore electrically placed across the insulation resistance barrier in sensor 10 (i.e. across sheath 12 and one of the element lead wires). Amplifier 78 measures the voltage difference across this barrier which is generated by voltage $V_P$. A/D converter 50 samples the sheath-to-lead voltage provided by amplifier 78 at a selected rate under the control of microprocessor 52. Microprocessor 52 stores the resulting voltage samples in memory 56, performs analysis on the stored samples and communicates one or more of the samples or diagnostic results over process control loop 42.

When measuring the sheath-to-lead voltage, microprocessor 52 turns off external voltage or current sources, such as current source 45, that are connected to temperature sensor 10 such that amplifier 78 measures only the voltage generated by electrolytic action in sensor 10.

Insulation resistance measurement circuit 80 measures the insulation barrier within sensor 10 between sensor sheath 12 and sensor element 61, which is represented in FIG. 2 by insulation resistance $R_I$ (shown in phantom). Sensor sheath 12 should be electrically isolated from sensor element 61 and element leads 62, 64, 66 and 68. Insulation resistance $R_I$ is the resistance between sensor sheath 12 and any one of the element leads 62, 64, 66 and 68. The insulation resistance $R_I$ should be very high in a good sensor, on the order of 100-500 megohms. An insulation resistance below 1 megohm might be considered a failed sensor.

Measurement circuit 80 includes voltage source 82, measurement resistance $R_3$, amplifier 84 and switch 86. Voltage source 82 is connected between measurement resistance $R_3$ and ground terminal 72. Measurement resistance $R_3$ is connected in series with voltage source 82, switch 86 and insulation resistance $R_I$, which is in series with reference resistance $R_{REF}$ and pull-down resistance $R_2$. Measurement resistance $R_3$, insulation resistance $R_I$, reference resistance $R_{REF}$ and pull-down resistance $R_2$ form a current path from voltage source 82 to ground terminal 72. Current flowing through the current path is the leakage current from sensor sheath 12 to RTD sensor element $R_1$, which is a function of the insulation resistance $R_I$. The voltage drop across measurement resistance $R_3$ is a function of the leakage current In and thus the insulation resistance $R_I$. The non-inverting and inverting inputs of amplifier 84 are connected across measurement resistance $R_3$ to measure the voltage drop across measurement resistance $R_3$. In a preferred embodiment, amplifier 84 has a very low input bias current. The output of amplifier 84 is connected to A/D converter 50 which converts the voltage measurement to a digital value at a selected rate under the control of microprocessor 52. Microprocessor 52 stores the resulting digital values in memory 56. When microprocessor 52 makes an insulation resistance measurement, microprocessor 52 turns off current source 45 and closes switch 86 to connect measurement circuit 80 to terminal 5 to drive leakage current $I_L$ through insulation resistance $R_I$. Once the measurement has been completed, microprocessor 52 opens switch 86, thereby disconnecting voltage source 82 from sensor sheath 12.

Microprocessor 52 performs diagnostic tests based on the stored values and communicates the values or diagnostic results to process control loop 42. As part of its diagnostic functions, microprocessor 52 determines whether insulation resistance $R_I$ or the sheath-to-lead voltage $V_P$ reach predetermined values stored in memory 56. If so, microprocessor 52 identifies sensor 10 as a failing or failed sensor and notifies control equipment coupled to process control loop 42. For example, microprocessor sets an alert indicating a failing sensor if one or more of the measurement values reach a first level and sets an alarm indicating a failed sensor if one or more of the measurements reach a second level. Microprocessor 52 also tracks a long term trend of the change in $R_I$ and $V_P$, which can be used as an early indication of sensor degradation.

In an alternative embodiment (not shown), temperature transmitter 40 is coupled to a plurality of temperature sensors 10. Terminal block 44 and multiplexer 46 are simply extended to accommodate the additional sensors. Each sensor has a sheath-to-lead voltage measurement circuit 76 and insulation resistance measurement circuit 80 which is fed to A/D converter 50. Alternatively, the same measurement circuits can be used with appropriate multiplexing.

In another alternative embodiment, temperature transmitter includes a real time analog measurement circuit as opposed to the digital measurement circuit shown in FIG. 2. The analog measurement signals generated by sheath-to-lead voltage measurement circuit 76 and insulation resistance measurement circuit 80 are provided to an analog comparison circuit 87 (shown in phantom). The comparison circuit compares the measurement signals with predetermined levels and generates an alert or alarm 88 which is transmitted over loop 42 by input-output circuit 58. The predetermined levels can be stored in memory 56 and provided to the comparison circuit in analog form by microprocessor 52 or can be generated by a reference level generator 89 (shown in phantom). Generator 89 includes digital or analog components, such as an adjustable voltage divider. Various other circuit configurations can also be used to provide real time analog measurements of the insulation resistance and the sheath-to-lead voltage.

Figure 3:
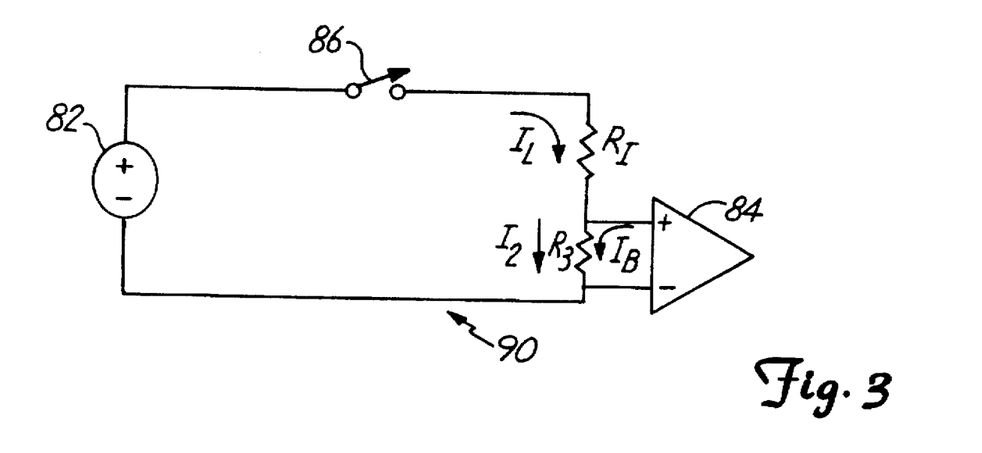
FIG. 3 is a schematic diagram of an alternative insulation resistance measurement circuit.

FIG. 3 is a schematic diagram illustrating an alternative insulation resistance measurement circuit 90 according to the present invention. The same reference numerals are used in FIG. 3 as were used in FIG. 2 for common elements, and several elements appearing in FIG. 2 have been removed for simplicity. The sensor insulation resistance $R_I$ is connected in series with measurement resistance $R_3$, and amplifier 84 is connected across measurement resistance $R_3$. Voltage source 82 is connected across the series connection of resistances $R_I$ and $R_3$ through switch 86. Switch 86 can include any suitable switch, but preferably includes a semi-conductive switching element such as a transistor.

The embodiment shown in FIG. 3 is particularly useful with amplifiers having a high input bias current or an unknown input voltage offset since it compensates for the amplifiers' deficiencies. The measurement and compensation are performed in two steps. In step one, microprocessor opens switch 86 so that the only current flowing through measurement resistance $R_3$ is the input bias current, which is the common mode circuit voltage of amplifier 84 multiplied by $R_3$. The resulting voltage at the output of amplifier 84 is converted into a digital value by A/D converter 50 and stored in memory 56 by microprocessor 52. In step 1, $$V_1 = I_B R_3 \qquad \text{Equation 2}$$

where, $V_1$ = voltage drop across resistance $R_3$ during step 1;

$I_B$ = input bias current of amplifier 84; and $R_3$ = resistance of measurement resistor $R_3$.

In step two, microprocessor 52 closes switch 86. The current $I_2$ flowing through measurement resistance $R_3$ is now the leakage current $I_L$ through insulation resistance $R_I$ plus the input bias current $I_B$:

$$I_2 = I_L + I_B \qquad \text{Equation 3}$$

As a result, the voltage drop across $R_3$ becomes:

$$V_2 = I_2 R_3 = (I_L + I_B) R_3 \qquad \text{Equation 4}$$

where, $V_2$ = voltage drop across resistor $R_3$ during step 2;

$I_2$ = current flowing through resistance $R_3$ during step 2; and $I_L$ = leakage current through insulation resistance $R_I$.

Subtracting Equation 3 from Equation 4, $$V_2 - V_1 = I_L R_3 \qquad \text{Equation 5}$$

As shown in Equation 5, the resulting voltage is representative of the sensor insulation leakage current $I_L$ with the bias current and offset voltages cancelled. The computations shown in Equation 5 are performed by microprocessor 52.

When insulation resistance measurement circuit 80 is inactive, it is desirable to force the sheath lead 70 to the same potential as RTD sensor element $R_1$ to minimize potential across the insulating interface, which, in turn, minimizes the potential of breakdown or leakage development over time.

Figure 4:
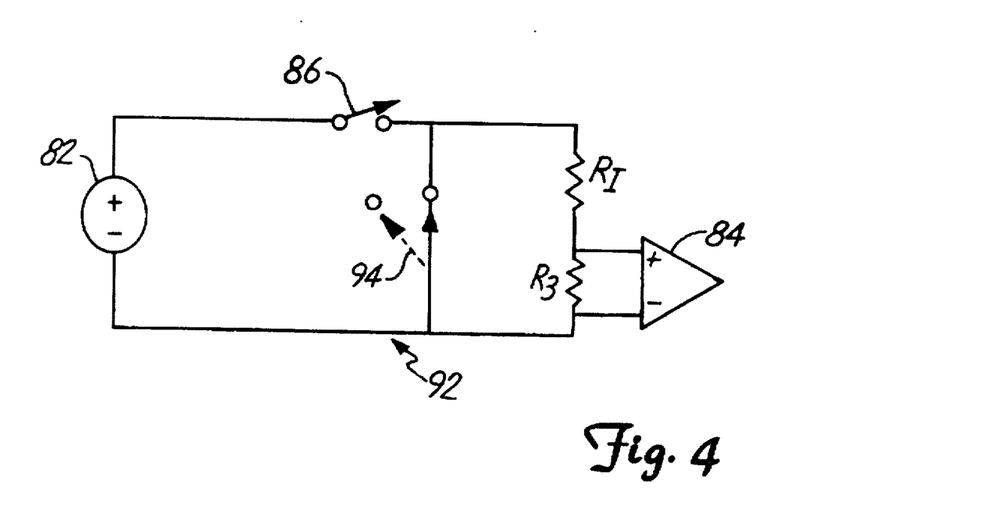
FIG. 4 is a schematic diagram of another alternative insulation resistance measurement circuit.

FIG. 4 is a schematic diagram of another alternative insulation resistance measurement circuit according to the present invention. Insulation resistance measurement circuit 92 further includes a switch 94 connected in parallel with the series connection of insulation resistance $R_I$ and measurement resistance $R_3$. In the embodiment shown in FIG. 3, switch 86 preferably has a very high impedance in the open state. With the addition of switch 94, switch 86 no longer requires a very high impedance in the open state. Microprocessor 52 operates switches 86 and 94 such that when switch 86 is in the open state, switch 94 is in the closed state, and when switch 86 is in the closed state, switch 94 is in the open state. Because switch 94 is closed when switch 86 is open, even if switch 86 has some leakage, the voltage potential across the series connection of resistances $R_I$ and $R_3$ is equalized such that very little leakage current flows other than the input bias current of amplifier 84.

FIG. 5 is a block diagram illustrating a temperature sensor 100 coupled to a thermocouple sensor 60 in accordance with the present invention. Sensor 60 has a sheath 104 and a thermocouple element 106. Thermocouple element 106 creates a voltage $V_{TCINPUT}$ across terminals 1 and 2, which are applied to amplifier 48 through multiplexer 46. Transmitter 100 measures the temperature of thermocouple element 106 by determining a thermocouple voltage $V_{TC}$ with the following equation:

$$V_{TC} = \frac{V_{TCINPUT}}{V_{TCREF}} (V_{TCREFNOM}) \quad \text{Equation 6}$$

where, $V_{TCINPUT}$=measured voltage across terminals 1 and 2 of terminal block 44 sensed by amplifier 48;

$V_{TCREF}$=measured voltage generated by voltage reference circuit 108 sensed by amplifier 48; and $V_{TCREFNOM}$=nominal value of voltage reference circuit 108 stored in memory 56.

Voltage reference circuit 108 is connected between reference resistance $R_{REF}$ and ground terminal 72 for providing voltage reference $V_{TCREF}$ to multiplexer 46. Voltage reference circuit 108 includes resistors 110 and 112 connected as a voltage divider and Zener diode 114.

The junction between two dissimilar metals formed at terminal 1 introduces a cold junction error voltage proportional to the temperature of the junction. Microprocessor 52 senses the error voltage by measuring the temperature of the junction at terminal 1 based upon the resistance of a platinum resistance thermometer (PRT) sensor 116 and subsequently using a standard equation or look-up table in memory 56 to determine the cold junction error voltage. The resistance of PRT sensor 116 is measured using Equation 1 by applying a source current $I_S$ with current source 45, as discussed above with reference to FIG. 2.

Microprocessor 52 calculates $V_{TC}$ according to Equation 6 above, then effectively subtracts the resistance of PRT sensor 116 from $V_{TC}$ using an appropriate look-up table or equation stored in memory 56. Then, the resulting compensated temperature of thermocouple element 18 is coupled to process control loop 42 through input-output circuit 58. Sheath-to-lead voltage measurement circuit 76 and insulation resistance measurement circuit 80 operate in the same fashion as was discussed with reference to FIGS. 2-4.

Figure 6:
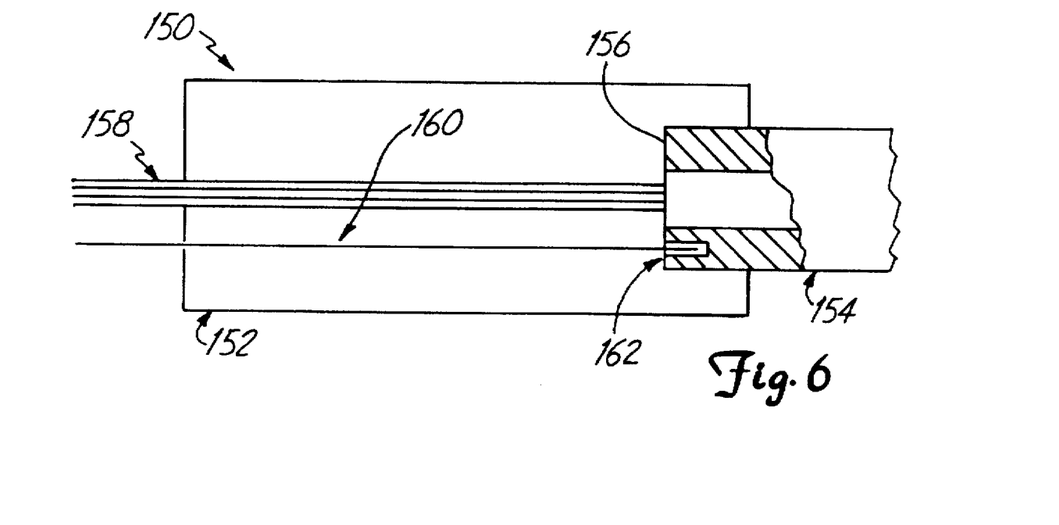
FIG. 6 is a fragmentary sectional view of a temperature sensor having a sheath lead secured to a sensor sheath according to one embodiment of the present invention.
Figure 7:
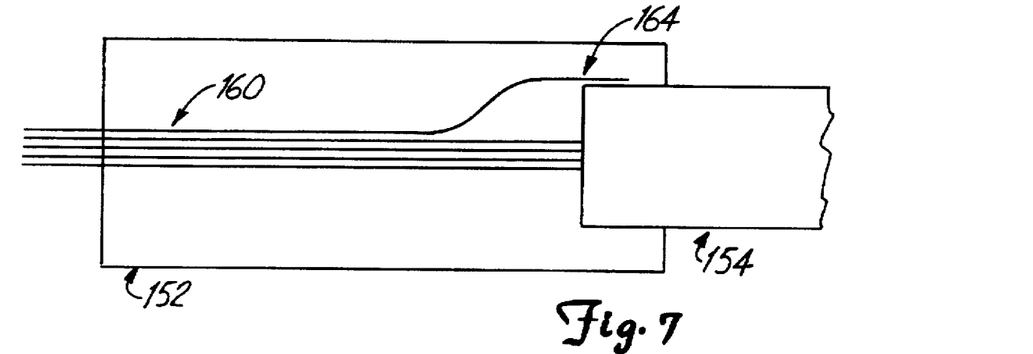
FIG. 7 is a fragmentary sectional view of a temperature sensor having a sheath lead secured to a sensor sheath according to another embodiment of the present invention.
Figure 8:
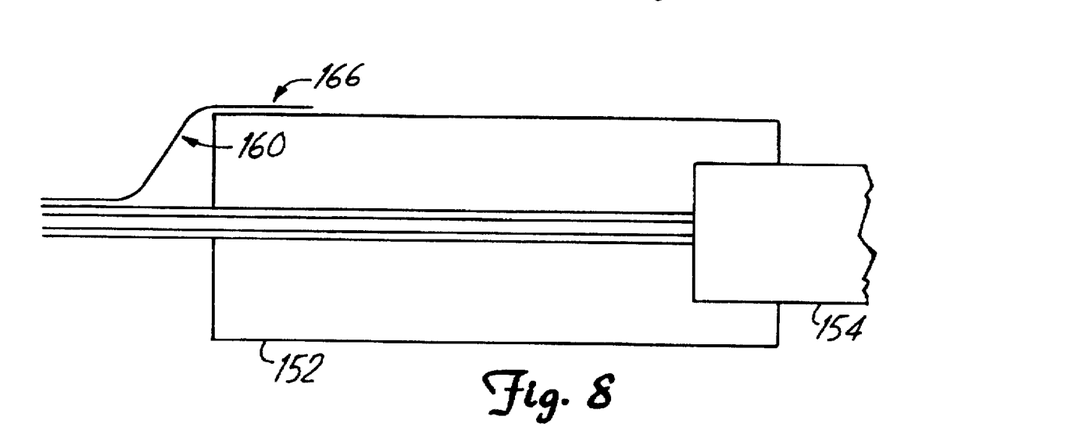
FIG. 8 is a fragmentary sectional view of a temperature sensor having a sheath lead secured to a rear sensor housing according to another embodiment of the present invention.

FIGS. 6-8 illustrate the attachment of the sensor sheath to the temperature sensor according to various embodiments of the present invention. In FIG. 6, temperature sensor 150 includes rear sensor housing 152 and sensor sheath 154, which are formed of suitable materials such as stainless steel. Sensor sheath 154 is a small diameter metal tube having a proximal end 156 which is secured to rear sensor housing 152 in a known manner. A sensor element (not shown) is mounted within a distal end of the tube. Four element leads 158 extend through sensor sheath 154 and rear sensor housing 152 for connection to a measurement device, such as a temperature transmitter. A sheath lead 160 is attached to proximal end 156 of sensor sheath 154 and extends through rear sensor housing 152 for connection to the measurement device. In the embodiment shown in FIG. 6, sheath lead 160 is welded to proximal end 156 through a TIG weld 162.

In the embodiment shown in FIG. 7, sheath lead 160 is secured to proximal end 156 along an outer diameter surface 164 of sensor sheath 154. Sheath lead 160 can be secured by spot welding or brazing, for example. In FIG. 8, sheath lead 160 is secured to an outer diameter surface 166 of rear sensor housing 152 by spot welding or a brazing, for example. The locations and methods of attaching sheath lead 160 to rear sensor housing 152 or sensor sheath 154 provided herein are examples only. Other attachment locations or attachment methods can also be used. Sheath lead 160 can also be attached to any other element which is in electrical contact with rear housing 152 or sensor sheath 154. As such, the term "sheath" used in the specification and in the claims refers to the sheath itself or any element in electrical contact with the sheath.

Although the present invention has been described with reference to preferred embodiments, workers skilled in the art will recognize that changes may be made in form and detail without departing from the spirit and scope of the invention. For example, multiple sensors could be coupled to a single transmitter, with an appropriate multiplexer. The parasitic voltage and insulation resistance measurement circuits can be internal or external to the transmitter, and can have various circuit configurations for providing an analog voltage to A/D converter 50 which is representative of the parameter being measured. In addition, a temperature sensor having a sheath lead according to the present invention can be used with a variety of different transmitters and transmitter configurations or any type of temperature measurement device. The configuration discussed herein is provided only as an example. Further, any type of temperature responsive sensor may be used, and the RTD and thermocouple are merely examples. Additionally, the sheath may be of any shape or materials, and the connection to the sheath may be through any technique. The term "coupled" can include various types of connections or couplings and can include a direct connection or a connection through one or more intermediate components.

What is claimed is:

1. A temperature transmitter in a process control comprising:

a temperature sensor comprising:

a sensor sheath;

a sensor element positioned within the sensor sheath;

an element lead coupled to the sensor element and extending from the sensor sheath; and a sheath lead coupled to the sensor sheath and extending from the sensor sheath, wherein the element lead and the sheath lead provide signals to be measured; and a transmitter circuit comprising:

an A/D converter coupled to receive the signals from the element lead and the sheath lead;

a microprocessor coupled to the A/D converter; and an input-output circuit coupled to the microprocessor for communication with the process control loop.

2. The temperature transmitter of claim 1 wherein the transmitter circuit further comprises a sheath-to-lead voltage measurement circuit coupled between the element lead, the sheath lead and the A/D converter.

3. The temperature transmitter of claim 2 wherein the sheath-to-lead voltage measurement circuit comprises an amplifier having first and second inputs coupled to the sheath lead and the element lead, respectively, and having an amplifier output coupled to the A/D converter.

4. The temperature transmitter of claim 1 wherein the temperature sensor further comprises an insulation resistance between the sensor sheath and the element lead and wherein the transmitter circuit further comprises an insulation resistance measurement circuit coupled between the sheath lead and the A/D converter.

5. The temperature transmitter of claim 4 wherein the insulation resistance measurement circuit comprises:
 a measurement resistance coupled to the sheath lead, in series with the insulation resistance;
 a voltage source coupled in series with the measurement resistance; and
 an amplifier having first and second inputs coupled in parallel with the measurement resistance and having an amplifier output coupled to the A/D converter.

6. The temperature transmitter of claim 5 wherein the transmitter circuit further comprises a first switch coupled in series with the voltage source and the sheath lead.

7. The temperature transmitter of claim 6 wherein the transmitter circuit further comprises:
 a second switch coupled in parallel with the series coupling of the measurement resistance and the insulation resistance; and
 wherein the first and second switches have conducting and non-conducting states, wherein the first switch is substantially in the conducting state when the second switch is substantially in the non-conducting state and wherein the first switch is substantially in the non-conducting state when the second switch is substantially in the conducting state.

8. The temperature transmitter of claim 7 wherein the first and second switches include control terminals coupled to and controlled by the microprocessor.

9. The temperature transmitter of claim 1 wherein the sensing element comprises an RTD.

10. The temperature transmitter of claim 9 wherein the transmitter circuit further comprises:
 a current source;
 a reference resistance;
 first, second, third and fourth element leads extending from the sensor sheath;
 wherein the RTD has first and second terminals;
 wherein the first element lead is coupled between the first terminal of the RTD and the reference resistance;
 wherein the second element lead is coupled to the first terminal of the RTD;
 wherein the third element lead is coupled to the second terminal of the RTD; and
 wherein the fourth element lead is coupled between the second terminal of the RTD the current source.

11. The temperature transmitter of claim 1 wherein the sensing element comprises a thermocouple.

12. The temperature transmitter of claim 11 wherein the transmitter circuit further comprises:
 a reference resistance;
 first and second element leads extending from the sensor sheath;
 wherein the thermocouple has first and second terminals;
 wherein the first element lead is coupled between the first terminal of the thermocouple and the reference resistance; and
 wherein the second element lead is coupled to the first terminal of the thermocouple.

13. The temperature transmitter of claim 1 wherein temperature sensor includes a plurality of temperature sensors, with each temperature sensor comprising an element lead and a sheath lead and wherein the transmitter circuit comprises a plurality of inputs coupled to the element leads, the sheath leads and the A/D converter.

14. The temperature transmitter of claim 1 wherein the transmitter circuit further comprises means for comparing the signals to be measured with a predetermined level and for generating a signal as a function of the comparison.

15. A temperature transmitter in a process control loop, comprising:
 a sensor housing;
 temperature sensing means positioned within the temperature sensor housing for sensing a temperature and providing a sensor output related to the sensed temperature;
 an element lead coupled to the sensor output and extending from the sensor housing;
 a sheath lead coupled to the sensor housing and extending from the sensor housing;
 A/D converter means coupled to the element lead and the sheath lead for converting analog signals received on the element lead and the sheath lead into digital signals;
 microprocessor means coupled to the A/D converter for controlling operation of the A/D converter; and
 input-output means coupled to the microprocessor for sending and receiving information over the process control loop.

16. The temperature transmitter of claim 15 and further comprising means coupled to the element lead and the sheath lead for measuring a voltage between the sensor housing and the element lead.

17. The temperature transmitter of claim 15 and further comprising means coupled to the sheath lead for measuring an insulation resistance between the sensor housing and the element lead.

18. A temperature transmitter in a process control loop, comprising:
 a temperature sensor comprising:
  a sensor sheath;
  a sensor element positioned within the sensor sheath for providing a temperature signal representative of a temperature of the sensor element;
  an element lead coupled to the sensor element and extending from the sensor sheath; and
  a sheath lead coupled to the sensor sheath and extending from the sensor sheath; and
 a transmitter circuit comprising:
  temperature measurement means coupled to the element lead for generating a temperature measurement as a function of the temperature signal;
  an input-output circuit coupled to the temperature measurement means for communication with the process control loop; and
  insulation resistance measurement means coupled to the sheath lead for generating an insulation resistance measurement as a function of a resistance between the element lead and the sheath lead.

19. The temperature transmitter of claim 18 wherein the transmitter circuit further comprises:

a reference level generator which generates a reference level; and an analog comparison circuit coupled to the insulation resistance measurement means and to the reference level generator which generates a comparison signal as a function of a comparison of the insulation resistance measurement and the reference level.

20. The temperature transmitter of claim 18 wherein the transmitter circuit further comprises voltage measurement means coupled between the element lead and the sheath lead for generating a sheath-to-lead voltage measurement signal.

* * * * *